United States Patent Office 2,935,368
Patented May 3, 1960

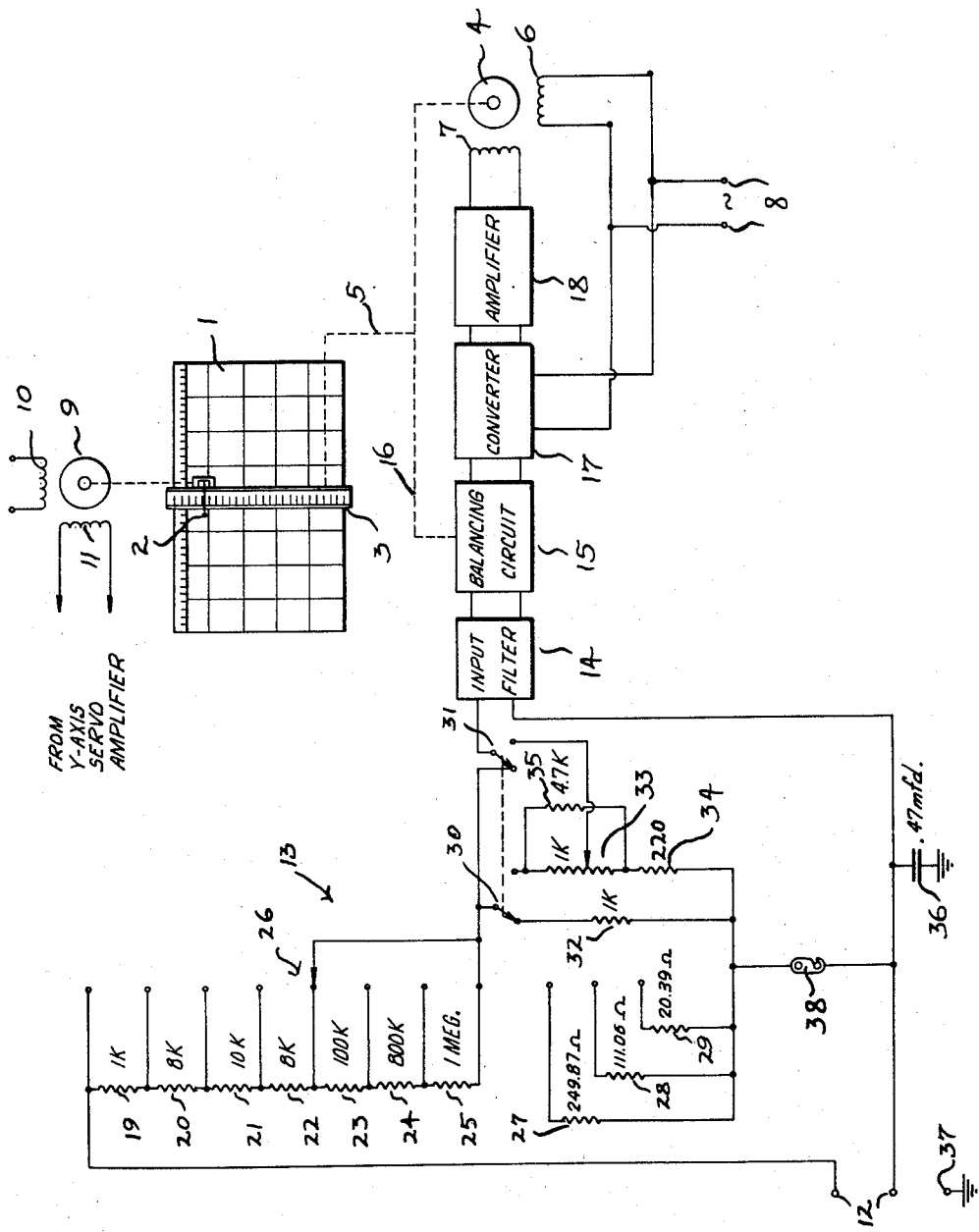

2,935,368
VARIABLE RANGE GRAPHICAL RECORDER

Francis L. Moseley, Pasadena, Calif., assignor to
F. L. Moseley Co., a corporation of California Application July 1, 1957, Serial No. 669,067

3 Claims. (Cl. 346—32)

This invention relates to graphical recorders and more particularly to a graphical recorder having both fixed and variable ranges for recording electrical signals.

In conventional graphical recorders it is well known to position a marking element with respect to a recording medium in accordance with the fluctuations in a variable to be recorded. Frequently, a servo system is linked to a marking element to cause the marking element to follow the fluctuations in a signal applied to the servo system. Movement of a recorder marking element with respect to a recording medium is limited by the boundaries and by the edges of the recording medium. Accordingly, provision must be made in a recorder for varying the sensitivity of the recorder to insure that the movement of the marking element in following the fluctuations in signals of various amplitudes is within the predetermined limits of movement set by the boundaries.

Where a graphical recorder is designed to produce records with a high degree of accuracy a step-type attenuator may be connected to the input of the servo system to vary the sensitivity of the recorder. By using precision electrical resistors, a step-type attenuator may be constructed which is capable of passing a predetermined calibrated fractional part of an input signal to a servo system for providing a record which accurately represents an input signal. However, the various positions of a step-type attenuator do not always correspond to the magnitude of a signal to be recorded. On the other hand, a continuously variable attenuator may be used to modify the sensitivity of the recorder for any magnitude of input signal within the range of the attenuator and recorder, but a continuously variable attenuator suffers from not being capable of accurate calibration.

Accordingly, it is one object of the present invention to provide a graphical recorder which includes a calibrated type of step attenuator along with means for selectively passing a variable portion of an input signal.

It is an additional object of the present invention to provide a graphical recorder having both fixed and variable ranges.

It is still another object of the present invention to provide a new and improved input attenuator circuit for use in a graphical recorder.

Briefly, in accordance with the invention there is provided a graphical recorder including a marking element adapted to trace the fluctuations in a signal within predetermined limits of movement of the marking element, means for passing a calibrated fixed fractional part of an input signal, and means for selectively passing a variable part of an input signal for continuously varying the sensitivity of the recorder to an input signal.

A better understanding of the invention may be had from a reading of the following detailed description and an inspection of the drawing in which the single figure is a combined circuit diagram and diagrammatic view of a graphical recorder.

Referring to the drawing there is shown diagrammatically a graphical recorder having a bed 1 upon which may be placed a recording medium such as a piece of graph paper. Arranged to travel over the surface of the bed 1 is a marking element 2 which may comprise a conventional recorder marking pen. The marking pen 2 is carried on a movable carriage 3 which is adapted to move longitudinally of the bed 1. By movement of the marking element 2 along the length of the carriage 3 the marking element 2 may be moved to any location on the bed 1.

The longitudinal direction of the bed 1 is referred to as the X-axis of the recordmer while the lateral direction of the bed 1 along the carriage 3 is referred to as the Y-axis of the recorder. By controlling the movement of the carriage 3 along the X-axis in accordance with one variable and controlling the movement of the pen 2 along the Y-axis in accordance with another variable a graph may be traced on a recording medium supported by the bed 1 corresponding to the relationship between two independent variables.

The carriage 3 is positioned along the X-axis of the bed 1 by a servo drive motor 4 which is mechanically linked to the carriage 3 by a mechanical linkage indicated diagrammatically by the dashed line 5. The servo motor 4 includes a pair of windings 6 and 7. One of the windings 6 is connected directly to a source of alternating current by means of the terminals 8. By applying an alternating current signal to the winding 7 having a predetermined phase relationship with respect to the winding 6 the motor 4 is caused to turn in a selected direction to position the carriage 3. In a similar fashion, the pen 2 may be positioned along the carriage 3 from a motor 9 having a pair of windings 10 and 11.

Input signals applied to the recorder are received by the terminals 12. A special attenuator circuit to be described in detail below is indicated generally at 13. A fractional portion of the input signal applied to the terminals 12 is passed by the attenuator circuit 13 to an input filter 14 which passes low frequency variations while inhibiting the passage of high frequency variations such as noise. The signal passed by the input filter is applied to a balancing circuit 15 within which the input signal is balanced against a voltage which may be generated from a standard cell (not shown) by means of a potentiometer (not shown) which is mechanically linked to the motor 4 via a mechanical linkage indicated diagrammatically by the dashed line 16.

In a condition of balance the voltage generated within the balancing circuit is substantially equal and opposite to the input signal and substantially no error signal is passed to a converter 17. However, upon a fluctuation in the input signal an error signal is passed to a converter 17 which functions to generate an alternating current signal of variable phase and amplitude corresponding to the polarity and magnitude of the error signal passed by the balancing circuit 15. The alternating current signal from the converter 17 bears a fixed phase relationship with respect to the alternating current wave applied to the terminals 8 since the converter 17 is energized by the alternating current wave applied to the terminals 8. Thus, an alternating current signal bearing a predetermined phase relationship to the signal applied to the terminals 8 and corresponding to the error signal amplified by an amplifier 18 and applied to the winding 7 associated with the motor 4. The motor 4 is caused to turn in response to the amplified alternating current signal which repositions the carriage 3 until a condition of balance is restored in the balancing circuit 15 and no error signal is passed to the converter 17.

Although only one servo system for controlling the recorder is illustrated it will be appreciated that the pen 2 may be moved along the length of the carriage 3 by the motor 9 from a servo system which is substantially identical to the one which is coupled to the carriage 3. For this reason, the drawing indicates that the winding 11 associated with the motor 9 may be connected to a Y-axis servo amplifier.

Referring in detail to the input circuit 13 there is provided a step-type attenuator including a series of resistors 19–25 between which are connected terminals of a switch 26. The values of the resistances 19–25 are arranged so that a predetermined calibrated fractional part of an input signal applied to the terminals 12 may be passed by positioning the contactor of the switch 26. As the contactor of the switch 26 is moved toward the lower end of the series connected resistors the fractional part of the signal passed by the attenuator is decreased. For signals having relatively large values the switch 26 is adapted to connect the entire string of resistors 19–25 in series with one of three resistors 27–29 of various sizes.

When the graphical recorder of the drawing is to be used with one of the fixed ranges corresponding to a position of the switch 26 for tracing a curve bearing a calibrated relationship to an input signal, a switch 30 and a switch 31 may be positioned as shown. In the position shown a fixed terminal resistor 32 is connected to the contactor of the switch 26. The entire signal appearing across the resistor 32 is passed via the switch 31 to the input filter 14. Thus, in the position shown a calibrated portion of the input signal applied to the terminals 12 is passed to the recorder so that the carriage 3 follows the fluctuations in the input signal with a high degree of accuracy.

Where the aforementioned accuracy is not required, or it is desired to adjust the recorder to receive input signals having values between the steps of the attenuator, the switches 30 and 31 may be positioned to connect a resistance element of a potentiometer 33 having a movable contactor in place of the fixed terminal resistor 32. The switch 31 connects the movable contactor of the potentiometer 33 to the input filter so that by moving the movable contactor along the length of the resistance element of the potentiometer 33 the portion of the input signal passed by the input attenuator may be varied. Accordingly, the sensitivity of the recorder as a whole is varied with the scale factor, i.e. the relationship between the degree of movement of the marking pen 2 and the input signal, being variable. A small resistor 34 may be connected serially with the resistance element of the potentiometer 33 so as to preclude the possibility of moving the contactor completely to a position in which no portion of the input signal is applied to the input filter 14. In addition, a resistor 35 may be connected across the potentiometer 33 so as to compensate for the presence of the resistor 34 to maintain the overall resistance of the variable terminal resistance equal to the value of the fixed terminal resistor 32.

In the illustrative embodiment of the drawing the input circuit connected to the terminals 12 is returned to ground reference potential via a bypass condenser 36. An auxiliary input terminal 37 allows the recorder to be connected to the grounded side of a source of input signals. In addition, the input circuit of the recorder of the figure is adapted to be modified by means of a shorting bar 38 which may be removed so that substantially all of the input signal applied to the terminals 12 is passed to the input filter 14 when the switch 26 is in its upper position. By this means, the recorder receives the entire input signal with maximum sensitivity which is desirable for very low level input signals.

By means of the invention, a new and improved graphical recorder is provided having both fixed and variable ranges of sensitivity. Although specific circuit component values have been given for the illustrative embodiment, it will be appreciated that the values are given by way of example, being indicative only of one workable arrangement. In the illustrative recorder, the values of the components indicated provide fixed ranges of recorder sensitivity capable of recording maximum input signals of 5 mv., 10 mv., 50 mv., 100 mv., 500 mv., 1 v., 5 v., 10 v., 50 v., 100 v., and 500 v. (where mv.=millivolts and v.=volts) for the positions of the switch 26 from top to bottom. With the variable terminal resistor connected, the maximum voltage acceptance of any range can be continuously expanded to about five times its indicated value by adjusting the potentiometer 33.

What is claimed is:

1. In a graphical recorder the combination of a marking element which is adapted to plot a variable within predetermined limits of travel, a servo system coupled to the marking element for causing the marking element to follow an electrical signal, a pair of input terminals, a signal attenuator connected across the input terminals having a plurality of discrete positions in each of which a predetermined fractional part of an input signal is passed by the signal attenuator, a fixed terminal resistor having a predetermined resistance value, a variable terminal resistor having a resistance element and a movable contactor, a fixed series resistor connected to the resistance element of the variable terminal resistor for defining a minimum resistance value when the contactor is positioned adjacent the series resistor, a circuit connection device for connecting the fixed terminal resistor to the signal attenuator in a first position in which the signal appearing across the terminal resistor is applied to the servo system so that a calibrated signal bearing a fixed fractional relationship to the input signal is passed to the servo system, said circuit connection device being adapted to connect the resistance element of the variable resistor to the signal attenuator in place of the fixed terminal resistor and to connect the variable contactor of the variable resistor to the servo system in a second position, and at least one compensating resistor connected in parallel with the variable resistor for maintaining the impedance presented to the signal attenuator substantially equal to the predetermined resistance value of said fixed terminal resistor whereby the sensitivity of the recorder may be varied to bring the movement of the marking element in following an input signal within the limits of travel of the marking element.

2. In a graphical recorder the combination of a marking element which is adapted to follow the fluctuations of an electrical signal within predetermined limits of travel of the marking element, a servo system coupled to the marking element for causing the marking element to follow the fluctuations in an electrical signal, a pair of input terminals, a signal attenuator having a plurality of positions in each of which a predetermined fractional part of a signal is passed by the attenuator, said signal attenuator being connected across the input terminals, a fixed terminal resistor having a predetermined resistance value adapted to be connected to the signal attenuator across which appears a calibrated signal corresponding to the predetermined fractional part of the input signal passed by the signal attenuator, means applying the signal appearing across the fixed terminal resistor to the servo system in a first mode of operation, a variable resistor adapted to be connected across a portion of the signal attenuator, a fixed series resistor connected to the variable resistor for defining a minimum resistance value when the variable resistor is at its minimum value, impedance compensating means connected across said variable resistor for presenting an impedance to the attenuator substantially equal to said predetermined resistance value of said fixed terminal resistor, and means connecting the variable resistor in a second mode of operation to the servo system whereby the movement of the marking element may be brought within the limits of travel of the marking element in following the fluctuations of an electrical signal.

3. In a graphical recorder an input circuit for passing a fractional part of an input signal including in combination a pair of input terminals, a calibrated signal attenuator having a plurality of discrete positions in which predetermined fractional parts of an input signal are passed by the attenuator, a fixed terminal resistor having a predetermined resistance value, a variable terminal resistor in the form of a potentiometer having a resistance element of said predetermined resistance value and a movable contactor, a fixed series resistor connected to the potentiometer resistance element for defining a minimum resistance value when the contactor is positioned adjacent the series resistor, a compensating resistor connected in parallel with the potentiometer resistance element having a value which when taken with said predetermined resistance value and said fixed series resistor presents an impedance equal to the signal attenuator substantially equal to said predetermined resistance value, a first switch for selectively connecting the fixed terminal resistor and the variable terminal resistor to the signal attenuator and a second switch for passing a signal appearing across the fixed terminal resistor to the recorder when the fixed terminal resistor is connected to the signal attenuator and for passing the signal appearing at the movable contactor of the variable resistor to the recorder when the resistance element of the variable resistor is connected to the signal attenuator.

References Cited in the file of this patent

UNITED STATES PATENTS

| | | |
|---|---|---|
| 2,464,708 | Moseley | Mar. 15, 1949 |
| 2,499,198 | Rich | Feb. 28, 1950 |
| 2,517,121 | Liston | Aug. 1, 1950 |
| 2,573,280 | Schmidt | Oct. 30, 1951 |
| 2,787,512 | Pierstorff | Apr. 2, 1957 |